US006969235B2

(12) United States Patent
Feest

(10) Patent No.: US 6,969,235 B2
(45) Date of Patent: Nov. 29, 2005

(54) AIR TURBINE STARTER WITH ANGULAR CONTACT THRUST BEARING

(75) Inventor: Robert H. Feest, Fountain Hills, AZ (US)

(73) Assignee: Honeywell International, Inc., Morristown, NJ (US)

( * ) Notice: Subject to any disclaimer, the term of this patent is extended or adjusted under 35 U.S.C. 154(b) by 219 days.

(21) Appl. No.: 10/440,673

(22) Filed: May 19, 2003

(65) Prior Publication Data

US 2004/0234369 A1 Nov. 25, 2004

(51) Int. Cl.$^7$ .............................. F01D 25/16; F02C 7/06
(52) U.S. Cl. ...................... 415/229; 384/515; 384/523; 384/528
(58) Field of Search ............................... 415/104, 142, 415/170.1, 175, 229; 60/786, 778; 384/513, 515, 516, 523, 527, 528

(56) References Cited

U.S. PATENT DOCUMENTS

| | | | |
|---|---|---|---|
| 4,285,632 A | * | 8/1981 | DeSalve ..................... 415/175 |
| 4,445,532 A | | 5/1984 | Mitchell |
| 4,459,121 A | | 7/1984 | Gazzera et al. |
| 4,779,413 A | | 10/1988 | Mouton |
| 4,871,296 A | | 10/1989 | Laessle et al. |
| 4,914,906 A | | 4/1990 | Burch |
| 5,145,334 A | | 9/1992 | Gutknecht |
| 5,209,388 A | | 5/1993 | Mittendorf et al. |
| 5,228,786 A | * | 7/1993 | Tanimoto et al. ........... 384/513 |
| 5,245,820 A | | 9/1993 | Zalewski et al. |
| 5,267,433 A | | 12/1993 | Burch |
| 5,356,277 A | * | 10/1994 | Yamaguchi et al. ........ 384/913 |
| 5,522,667 A | * | 6/1996 | Miyake ....................... 384/527 |
| 5,538,258 A | | 7/1996 | Hager et al. |
| 5,636,848 A | | 6/1997 | Hager et al. |
| 5,752,383 A | | 5/1998 | Rominek |
| 5,941,532 A | | 8/1999 | Flaherty et al. |
| 6,059,085 A | | 5/2000 | Farnsworth |
| 6,131,797 A | | 10/2000 | Gasdask et al. |
| 6,257,589 B1 | | 7/2001 | Flaherty et al. |
| 6,318,958 B1 | | 11/2001 | Giesler et al. |
| 2004/0234181 A1 | * | 11/2004 | Kobayashi et al. .......... 384/528 |

FOREIGN PATENT DOCUMENTS

| | | |
|---|---|---|
| DE | 94 10 105 U | 9/1994 |
| DE | 195 30 903 A1 | 3/1996 |
| EP | 0 272 151 A2 | 6/1988 |
| EP | 0 414 144 A2 | 2/1991 |
| WO | 2004/015646 A1 | 11/2004 |

OTHER PUBLICATIONS

PCT Written Opinion of the ISR Nov. 30, 2004.

* cited by examiner

*Primary Examiner*—F. Daniel Lopez
*Assistant Examiner*—Robert A. Edgar
(74) *Attorney, Agent, or Firm*—Ingrassia Fisher & Lorenz

(57) ABSTRACT

An air turbine starter for use in aircraft or other gas turbine engine applications. In a particular embodiment, the air turbine starter has a thrust bearing having an outer ring, an inner ring, a cage and balls. The outer ring has a first shoulder, a second shoulder and a race surface therebetween to receive the balls. The second shoulder is smaller than the first shoulder. The orientation of the cage is such that the pilot of the cage is aligned to the first shoulder of the outer ring. The raceway curvature of the inner ring, the internal clearance, and clearance between the pilot and outer ring are all increased. An improved thrust bearing is also provided.

39 Claims, 4 Drawing Sheets

AIR TURBINE STARTER WITH ANGULAR CONTACT THRUST BEARING

FIELD OF THE INVENTION

This invention relates generally to air turbine starters for gas turbine engines, and, in particular, to an air turbine starter.

BACKGROUND OF THE INVENTION

An air turbine starter is a device used to start a turbine engine, such as a gas turbine jet engine commonly found on aircraft. The air turbine starter is connected to the jet engine and is used to start the jet engine in generally the same way as a starter for an automobile is used to start the automobile's engine. The developer of the present inventions, Honeywell International, Inc., has for years successfully designed, developed, manufactured and repaired air turbine starters.

FIG. 1 shows a partial cut-away diagram of a conventional air turbine starter 100, having a first housing 103 which includes an air inlet 105, air outlets 107, and a second housing 111 including a turbine assembly 113, gearbox 115, and starter output shaft, not shown. The turbine assembly 113 has a turbine wheel 117 with circumferentially mounted blades 119, a rotatable drive shaft 121, and gear 123. Additional turbine starter features are disclosed in Honeywell's U.S. Pat. No. 6,318,958 (Giesler et al.) and U.S. Pat. No. 4,914,906 (Burch) which is incorporated by reference herein.

In order to start the jet engine the air turbine starter is activated. Generally speaking, activation is accomplished by connecting an air pressure duct to air inlet 105 to supply compressed air. Compressed air is directed by the contour passages of the first housing 105 through the blades 119 and is vented from air outlets 107. In operation, the energy of the moving air is converted by blades 119 into rotary motion, causing the turbine assembly 113 to rotate.

Stability of the turbine assembly 113 during starting and engine driving operations is important to the operational longevity of the air turbine starter 100. As shown in FIG. 2, an angular contact thrust bearing 201 is used to support and stabilize the turbine drive shaft 121. The angular contact thrust bearing 201 supports drive shaft 121 and allows it to rotate without much friction losses. As shown, in FIGS. 2 and 2A, the angular contact thrust bearing 201 has an outer ring 203, an inner ring 205, a cage 207, and balls 209.

During the process of starting the jet engine or driving the jet engine without starting as may be required for maintenance, significant forces are applied to the angular contact thrust bearing 201. Oil lubrication is supplied to the angular contact thrust bearing 201 as represented by arrow 211 in FIG. 2 and arrow 134 in FIG. 1 by an internal oil circulation system.

Bearing wear is understood to be a natural result of bearing operation. In particular, foreign matter in the oil or bearing components, heat and stress from use, and many other factors can cause bearing wear and degrade bearing performance. As shown in FIG. 2A, hard debris 213 may become lodged as a clump 215 in the angular contact bearing 201 between the cage 207 and outer ring 203. These debris may be from the manufacturing process (swarf, chips, or grit), from internal components (wear debris or chemical attack of bearing surfaces), from the outside environment (such as sand or dust), from lubricant breakdown (sludge or precipitates), or other sources.

Further, the debris 213 may become lodged in and or deteriorate the race surface 217 (also commonly known as a raceway) 217 and cause significant imperfections 219 in the race surface 217 of the outer ring 203. In a similar fashion, the debris 213 may cause significant imperfections 233 in the race surface 235 of the inner ring 205. Typically, the imperfections 219 and 223 occur in the regions of the race surfaces 217 and 235 where the force of thrust, shown as arrows 237, transfers between inner ring 205, ball 209 and outer ring 203.

In addition, debris 213 may cause imperfections such as gouges 221 or scratches in the surface of the ball 209. More specifically, debris 213 may lead to the breakdown of the lubricating film between the ball 209 and race surfaces 217 and 235, leading to the eventual spalling of the raceway and ball 209 materials—events which lead to shortened operational life of the bearing.

Proper operation of angular contact thrust bearing 201 is desired for proper operation of the starter. Should the angular contact thrust bearing 201 become seized or unduly worn, damage to the turbine assembly and or gearbox may result. In such an event a more extensive rebuild of the starter beyond mere bearing replacement may be needed. This may be costly and time consuming. However, it should be appreciated that despite this drawback, air turbine starters are generally operationally safe and reliable. Routine maintenance, including bearing inspection and replacement, is a normal periodic event based in part on the expected operational life of the angular contact thrust bearing 201.

Hence, there is a need in for an improved air turbine starter having a longer life bearing with improved characteristics to overcome one or more of the drawbacks identified above. The present invention satisfies one or more of these needs.

SUMMARY OF THE INVENTION

This invention provides air turbine starter with an improved angular contact thrust bearing for gas turbine applications, and an associated improved angular contact thrust bearing.

In particular, and by way of example only, one embodiment of the present invention provides an air turbine starter having a first housing defining an air inlet, an air outlet and a flow path therebetween. A second housing is coupled to the first housing to enclose a gearbox and an output shaft coupled to the gearbox and a turbine wheel having circumferentially mounted blades disposed in the flow path of the first housing. A rotatable turbine drive shaft joined to the turbine wheel and extends into the second housing to drive the gearbox. The turbine shaft is supported by at least one bearing. The bearing has a plurality of balls, each ball having a uniform diameter and a longitudinal centerline. The bearing has a radially inner ring having a first shoulder, a second shoulder and a race surface therebetween to receive the balls. The bearing also has a radially outer ring having a first shoulder, a second shoulder and a race surface therebetween, the second shoulder being smaller than the first shoulder. The outer ring is located concentrically about the inner ring, with the balls therebetween, in a plane generally perpendicular to a predetermined axis of rotation. An annular cage is located between the inner and outer rings and has openings to receive and separate the balls nested between the inner ring race surface and the outer ring race surface. An oil circulation system provides oil flow in a direction flowing from the first shoulder of the outer ring toward the second shoulder of the outer ring.

Moreover, according to an embodiment thereof, the invention may provide an air turbine starter bearing to permit two air turbine starter components to rotate relative to each other, the bearing including a plurality of rollers, each having uniform diameter and a longitudinal centerline. The bearing has a radially inner ring having a first shoulder, a second shoulder and a race surface therebetween to receive the rollers. The bearing has a radially outer ring having a first shoulder, a second shoulder and a race surface therebetween, the second shoulder being smaller than the first shoulder. The outer ring is located concentrically about the inner ring, with the rollers therebetween, in a plane generally perpendicular to a predetermined axis of rotation. An annular separator is located between the inner and outer rings and has openings to receive and separate the rollers nested between the inner ring race surface and the outer ring race surface. The separator has a pilot to align the separator to the first shoulder of the outer ring. Also, in another embodiment having many of the features describe above, the cage may have a lubrication attractive coating that tends not to hold or attract debris.

In yet another embodiment, the invention may provide an air turbine starter bearing to permit two air turbine starter components to rotate relative to each other, the bearing including a plurality of balls, each ball having a uniform diameter and a longitudinal centerline. The bearing has a radially inner ring having a first shoulder, a second shoulder and a race surface therebetween to receive the balls. The bearing has a radially outer ring having a first shoulder, a second shoulder and a race surface therebetween, the second shoulder being smaller than the first shoulder. The outer ring is located concentrically about the inner ring, with the balls therebetween, in a plane generally perpendicular to a predetermined axis of rotation. An annular cage is located between the inner and outer rings and has openings to receive and separate the balls nested between the inner ring race surface and the outer ring race surface. The cage has a pilot aligning the cage to the first shoulder of the outer ring.

In still another embodiment, the air turbine starter angular contract thrust bearing has some of the features describe above and includes an annular cage located between the inner and outer rings and characterized by a pilot to align the cage with the first shoulder of the outer ring. The cage also has openings to receive and separate the balls nested between the inner ring race surface and the outer ring race surface. Each cage opening is defined by an interior surface extending through the cage. The diameter of the interior surface is sized to receive an associated one of the balls. Each interior surface has a radially outer circumferential edge and a radially inner circumferential edge. The inner and outer circumferential edges of each opening are located one either side of the longitudinal centerline of the associated ball.

These and other objects, features and advantages of the preferred method and apparatus will become apparent from the following detailed description, taken in conjunction with the accompanying drawings which illustrate, by way of example the principles of the invention.

DETAILED DESCRIPTION

Before proceeding with the detailed description, it is to be appreciated that the present invention is not limited to use or application with a specific type of air turbine starter. Thus, although the present invention is, for the convenience of explanation, depicted and described with respect to one type of air turbine starter an angular contact bearing as may be used in connection with a gas turbine engine, this invention may be applied to other types and styles of air turbine starters used in other turbine engine applications.

Figure 1:
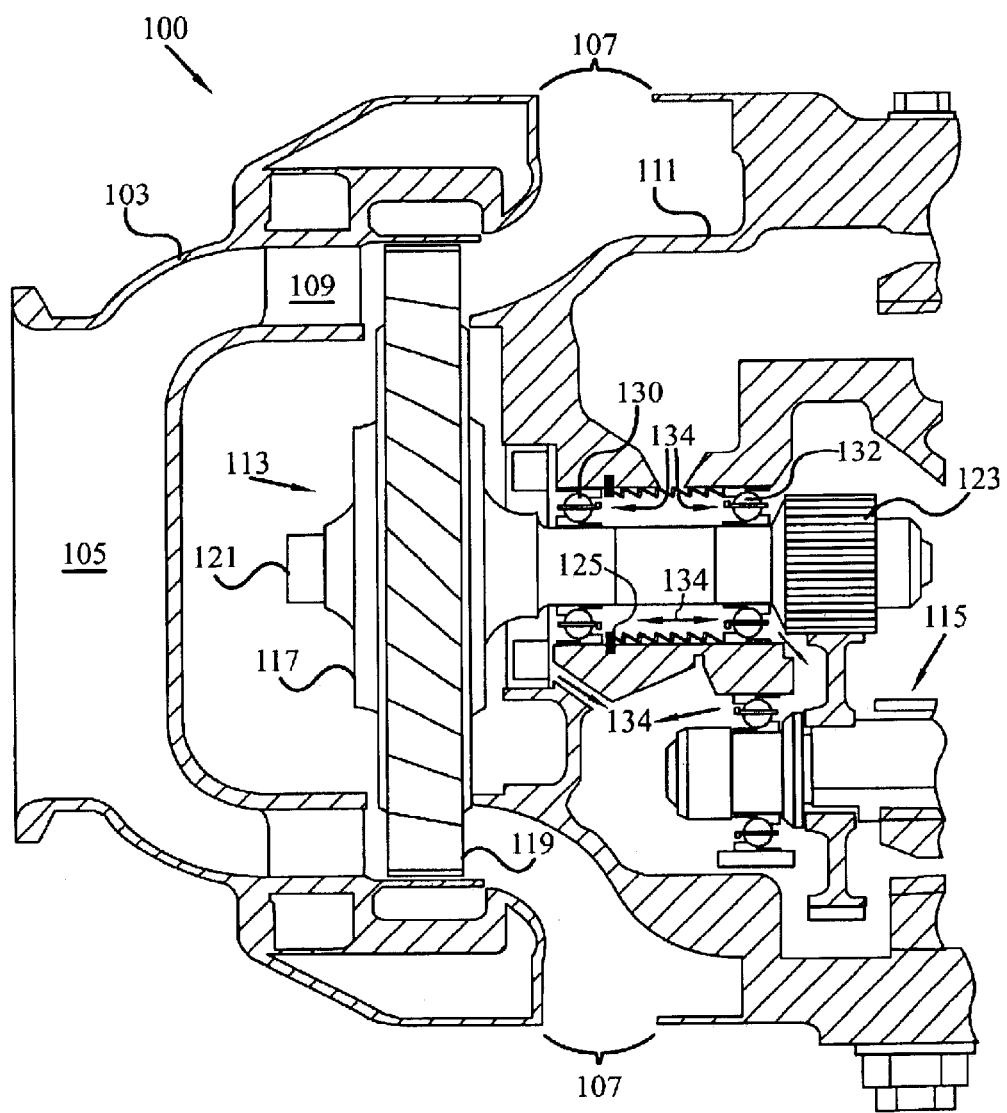
FIG. 1 shows a functional schematic cut-away diagram of an exemplary air turbine starter that may embody the present invention.

FIG. 1 shows a partial cut-away view of an exemplary air turbine starter 100 that may embody the present invention. Air turbine starter 100 has a first housing 103 which includes an air inlet 105, air outlets 107, a flow path 109 therebetween, and a second housing 111 including a turbine assembly 113, gearbox 115, and starter output shaft, not shown.

The turbine assembly 113 has a turbine wheel 117 with circumferentially mounted blades 119, a rotatable drive shaft 121, and gear 123. The angular contact thrust bearing 130 and the pinion bearing 132 supports the drive shaft 121 as it provides rotation force to gearbox 115. Under appropriate circumstances, additional angular contact thrust bearings 130 may be employed. The angular contact thrust bearing 130 may also be lubricated, such as by oil represented by arrows 134 internally circulated within second housing 111.

Figures 3, 3A:
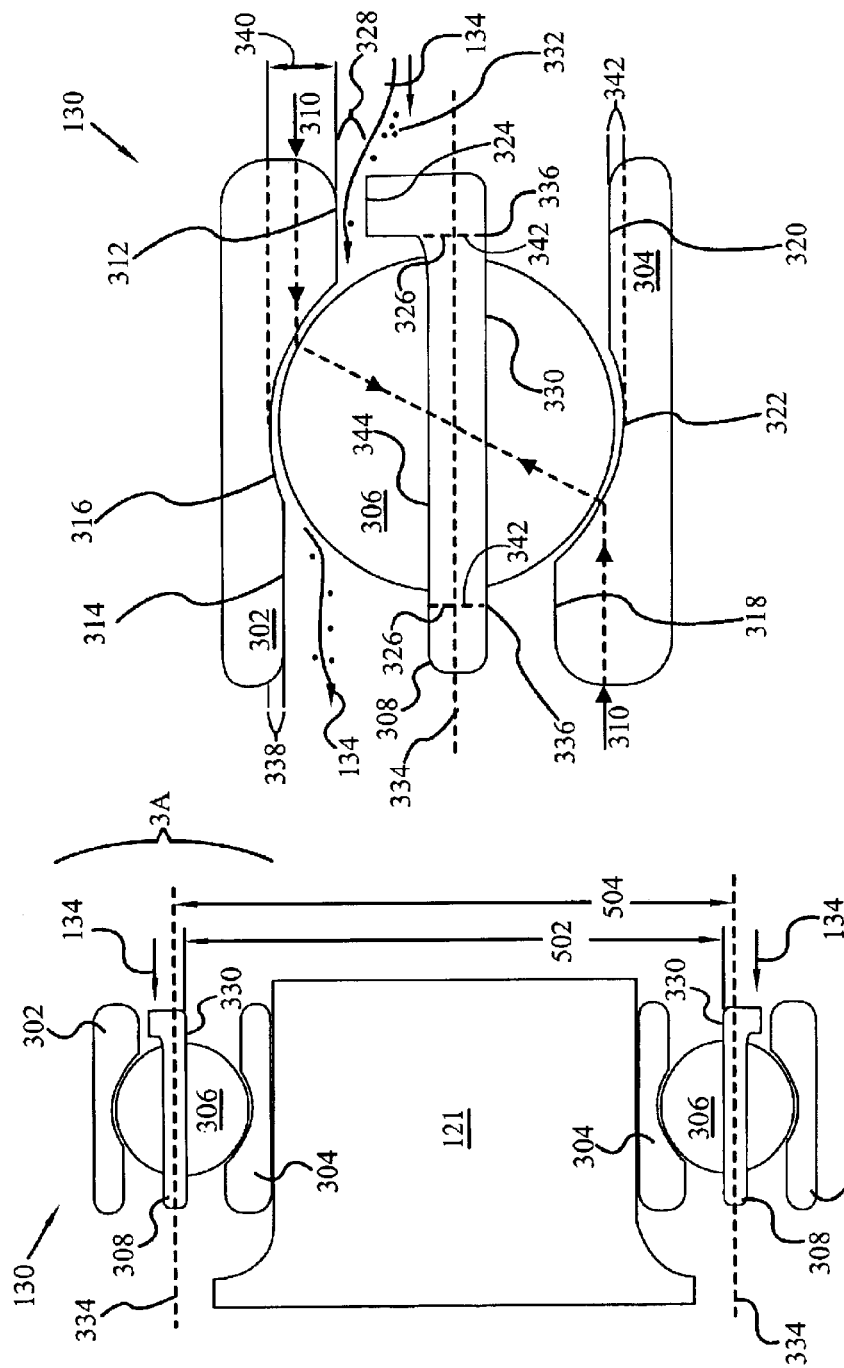
FIG. 3 is a partial cross-sectional view of an angular contact bearing assembly in relation to the turbine shaft of the air turbine starter of FIG. 1.
FIG. 3A is an enlarged cross-sectional view of the angular contact bearing shown in FIG. 3.
Figure 4:
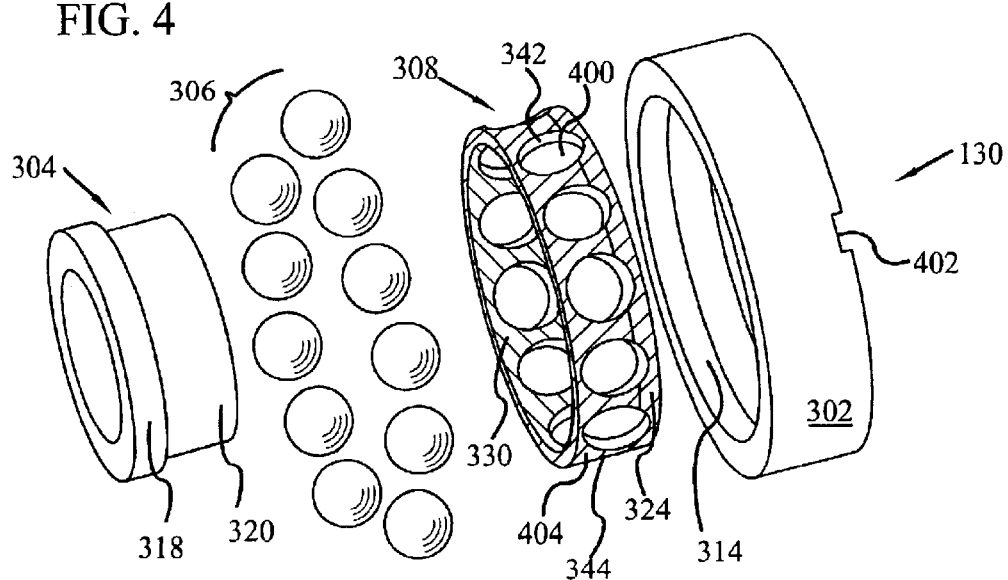
FIG. 4 is an exploded view of the angular contact bearing of the air turbine starter of FIG. 1.

The advantages of the thrust bearing 130 may be further appreciated with respect to the enlarged views of FIGS. 3 and 3A. The angular contact thrust bearing 130 has an outer ring 302, an inner ring 304, a set of substantially identical rollers such as balls 306, and separator such as cage 308. FIG. 4 provides an exploded view of the angular contact thrust bearing 130.

During operation of the air turbine starter, a thrust force is applied to the angular contact thrust bearing 130 by turbine wheel 117, and countered by spring clip 125 engaged in second housing 111. (see FIG. 1). The thrust force is represented by arrows 310 in FIG. 3A.

The outer ring 302 has a first shoulder 312, which may be identified as a thrust bearing shoulder, a second shoulder 314, which may be identified as a non-thrust shoulder, and a race surface 316 therebetween. The inner ring 304 has a first shoulder 318, which may be identified as a thrust bearing shoulder, a second shoulder 320, which may be identified as a non-thrust shoulder, and a race surface 322 therebetween. With respect to either the inner or outer rings, the race may also be commonly referred to as a raceway. The degree of curvature in the race surface/raceway is generally referred to as the race curvature. As shown, the outer ring is located concentrically about the inner ring, with the balls therebetween, in a plane generally perpendicular to the predetermined axis of rotation of drive shaft 121.

An annular separator, commonly referred to as a cage 308, is located between the inner ring 304 and the outer ring 302.

Figure 5:
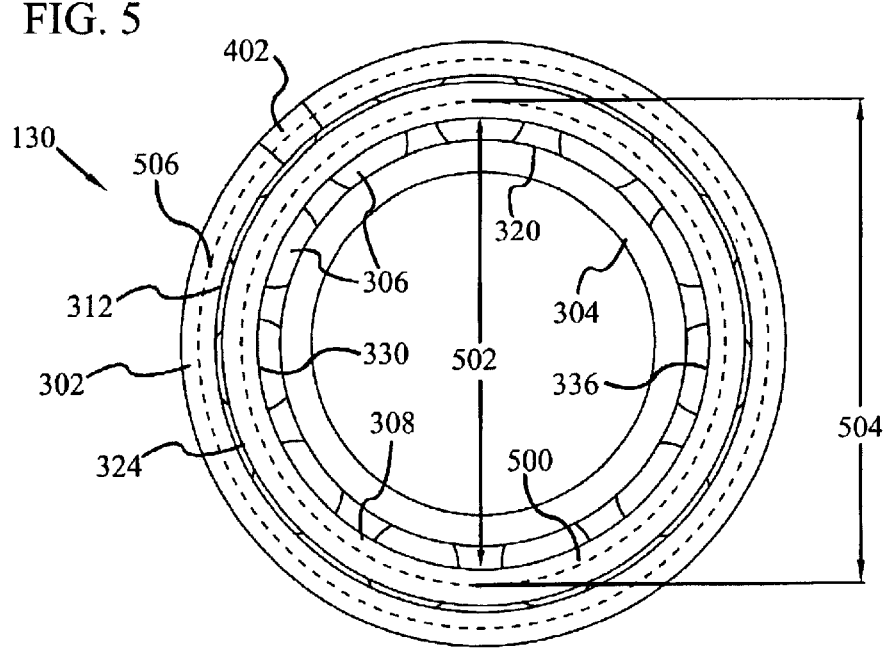
FIG. 5 is an elevational view of the angular contact of FIG. 4.

More specifically, the inside diameter of the cage, commonly known as the bore 502, is sized to permit the cage 308 to fit adjacent to the inner ring 304, see FIG. 5.

In addition, the cage 308 has openings, more commonly known as pockets 400 (see FIG. 4), the boundaries 326 of which are illustrated by dotted lines (FIG. 3A). The pockets 400 receive and separate the balls 306 nested between the race surface 322 of the inner ring 304 and the race surface 316 of the outer ring 302. More specifically, each pocket 400 is defined by an interior surface 342 extending through the cage 308. The diameter of the interior surface 342 is sized to receive an associated one of the balls 306. Each interior surface 342 has a radially outer circumferential edge 344 and a radially inner circumferential edge 330. The inner and outer circumferential edges 330, 344 of each pocket 400 are located one either side of the longitudinal centerline 334 of the associated ball 306. In addition, the cage may have a pilot 324 to align the cage 308 to the outer ring 302.

Figures 2, 2A:
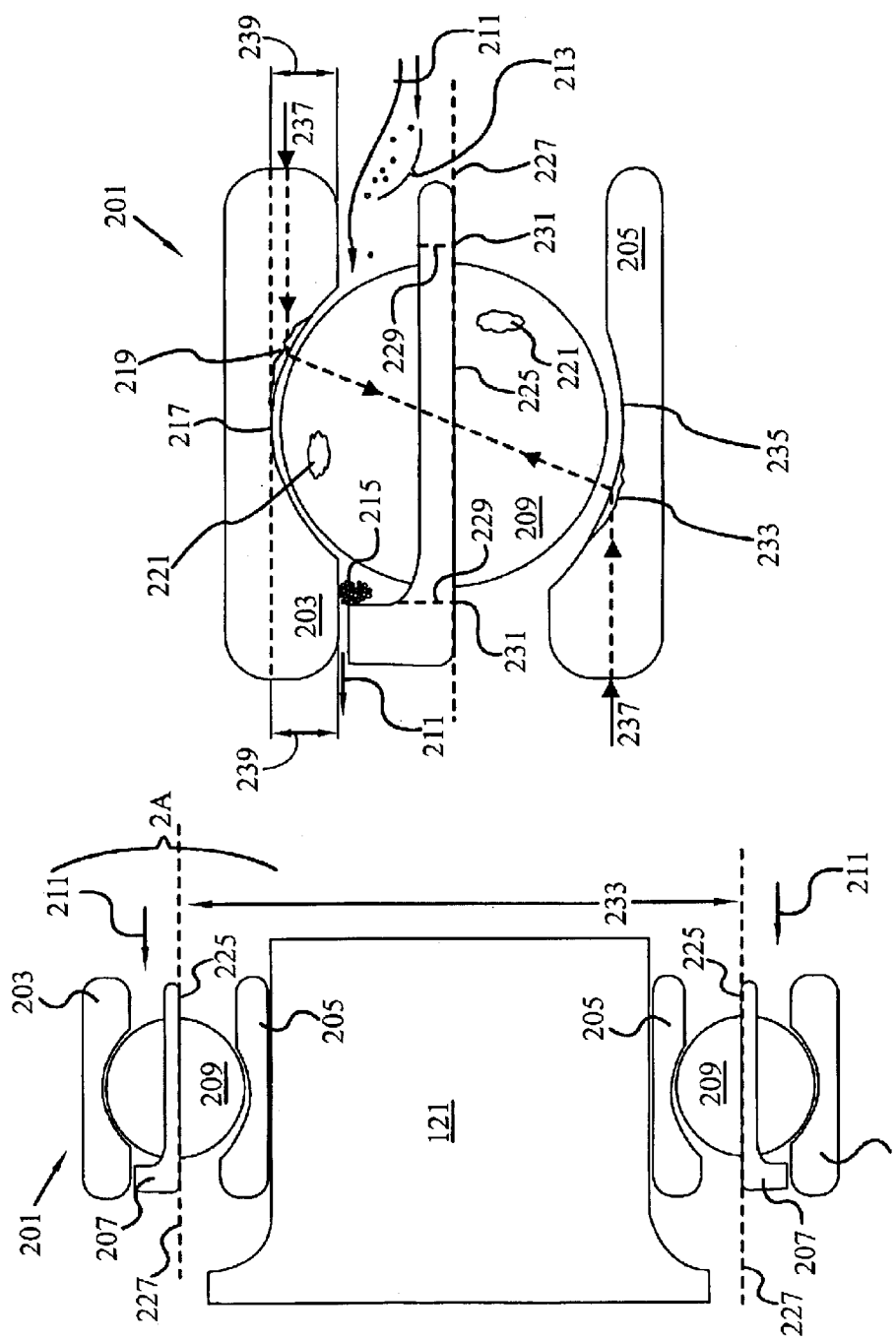
FIG. 2 is a partial cross-sectional view of a prior art angular contact bearing assembly in relation to a turbine shaft.
FIG. 2A is an enlarged cross-sectional view of the prior art angular contact bearing shown in FIG. 2.

In at least one embodiment, the orientation of the cage 308 is reversed to that of the prior art cage 207 such that the pilot 324 is aligned and proximate to first shoulder 312, see FIGS. 2A and 3A. As oil 134 is provided by an oil circulation system to flow through bearing 130 in a direction flowing from the first shoulder 312 of the outer ring 302 towards the second shoulder 314 of the outer ring 302, this reversed position reduces the blockage of oil and debris 332 within the bearing 130 and more easily allows debris 332 that have entered the bearing to exit the bearing. This reduces the damage to the bearing components from trapped debris. In addition, the clearance 328 between the pilot 324 and the first shoulder 312 may be increased to provide similar benefits. In general, the clearance is adjusted in dimension for bearing size, operating conditions and materials. In at least one embodiment, the clearance 328 between pilot 324 and first shoulder 312 is about 0.008 to 0.015 inch.

To further enhance the flow of oil 134 and debris 332 out of the angular contact thrust bearing 130, the height of second shoulder 314 of outer ring 302 may be reduced. In general, the height of both first shoulder 312 and second shoulder 314 is determined as a percentage of the diameter of ball 306. The height is appreciated to be the perpendicular linear measurement of the shoulder above the lowest point of the race surface. In similar fashion, the curvature of the race surface 316, commonly referred to as the race curvature, can generally be quantified as a percentage of the diameter of ball 306.

It should be understood and appreciated that, in general, the height 338 and 340 of the second shoulders 314 and 320 is some percentage greater than 0%, so that angular contact thrust bearing 130 does not inadvertently separate. As shown, the height 338 of the second shoulder 314 may be smaller than the height 340 of the first shoulder 312. Moreover, in at least one embodiment, the second shoulder 314 is a lesser percentage of the ball 306 diameter than is the first shoulder 312. These differences in shoulder height compare with the substantially equal prior art shoulder heights 239 as shown in FIG. 2A Under appropriate circumstance; the first shoulder 312 may be substantially about 15% to 28% of the ball 306 diameter, and the second shoulder 314 may be substantially between about 6% and 0% of the ball 306 diameter. With respect to inner ring 304, the race curvature of the race surface 322 and the height of first shoulder 318 are generally understood and appreciated to likewise be quantified as a percentage of ball 306 diameter.

A straight line tangent to a curve is understood and appreciated to provide a single point of contact between the line and curve. Where the curve is a portion of sphere's surface and the line is a portion of bearing ring, the load as between the sphere and bearing ring is concentrated upon a single point. When the surface of the bearing ring is substantially curved to contour to the curved surface of the sphere, and a lubricant such as oil is introduced between the bearing ring and sphere, the load between the sphere and bearing ring may be distributed beyond a mere single point of contact. In view of the above, the conformity of the race curvature of inner ring 304 and the race curvature of outer ring 302 are directly related to the performance of angular contact thrust bearing 130.

The internal clearance between the ball 306 and the race surface 322 of the inner ring 304 and the race surface 316 of the outer ring 302 is another component of performance. More specifically, the internal clearance may be simply determined from the following formula: outer ring raceway diameter—inner ring raceway diameter—two ball diameters=internal clearance of angular contact thrust bearing 130. The internal clearance may effect the volume of lubricant and the size of debris 332 that may pass between the surfaces without lodging. In general, the clearance is adjusted in dimension for bearing size, operating conditions and materials. In at least one embodiment, the internal clearance is substantially between about 0.0013 and 0.0019 inch.

Moreover, a thrust bearing is generally understood and appreciated to have a contact angle, commonly referred to as "Bo" or "βo". The contact angle is a function of both the internal clearance and the raceway curvature. The higher (or greater) the contact angle of the bearing, the greater the ability of the bearing to handle thrust load. The contact angle as produced by the clearance and raceway curvatures can be adjusted in dimension for bearing size, operating conditions and materials.

As noted above, the race curvatures of annular contact bearing 130 are generally quantified as a percentage of the diameter of the ball 306. Were the race curvature to be exactly 50% of the diameter of ball 306, the radius of ball 306 would be substantially identical to the radius of the circle defining the raceway curvature. In at least one embodiment, the race curvature of the race surface 322 of the inner ring 304 may be substantially about 51.5% to 53% of the diameter of ball 306, and the race curvature of the race surface 316 of the outer ring 302 may be substantially about 52% to 54% of the diameter of ball 306. In addition, ball 306 may preferably be substantially 9/32 inch in diameter, but all of these values can vary according to the application.

As shown in prior art FIG. 2, the bore diameter 233 of the typical cage 207 is such that the interior surface 225 is substantially in line with the centerline 227 of ball 209. In this prior art configuration, movement of the ball 209 to the boundaries 229 of the pocket 400, represented by dashed lines, initiates contact of the ball 209 with an edge 231, which can be an undesirable event accelerating wear of cage 207 and ball 209 (see FIG. 2A).

As shown in FIGS. 3 and 5, the bore of the cage 308 may be decreased such that the radially inner circumferential edge 330 of cage 308 is substantially below the longitudinal centerline 334 of the ball 306. More specifically, FIG. 3A is an enlarged cross sectional side view of angular contact thrust bearing 130. Each ball 306 has one longitudinal centerline 334 substantially parallel to inner edge 330 of cage 308. As described above, each cage 400 has an interior surface 342 located around an associated ball.

The annular nature of the angular contact thrust bearing 130 may be more fully appreciated in FIG. 5. As is shown, the bore diameter 502 of the cage 308 is smaller than the diameter 504 of a circle 500 as defined by the centers of balls 306. As the balls 306 move to contact the cage 308, the edge 336 of interior surface 342 is substantially below the point of contact. The point of contact between ball 306 and the interior surface 342 of pocket 400 is therefore a smooth surface as opposed to a sharp edge present in the prior art.

In general, the diameter 502 of cage 308 is adjusted in dimension for bearing size, operating conditions and materials. In at least one embodiment the bore diameter of cage 308 may be substantially about 1.170 inch.

As noted above, the bearing performance and operational life expectancy effects the cost of the operation of the air turbine starter 100. The Jones High Speed Ball and Roller Bearing Computer Program is commonly employed by practitioners in the bearing arts to predict bearing performance values. Provided in Table 1 below is a comparison of the angular contact thrust bearing 130 to a prior art angular contact thrust bearing 201 at an RPM speed of 22,500. Such a speed may be incurred in the motoring of a turbine engine for maintenance or other purposes. Table 2 provides a similar comparison at 39,500 RPM which may be incurred in the starting of a turbine engine. For both tables, Lambda is essentially the thickness of the lubricating film, such as oil, that is generated between the contact surfaces.

TABLE 1

22,500 RPM

| Parameter | Prior Art Bearing 201 | Improved Bearing 130 |
| --- | --- | --- |
| Race curvatures (Inner Ring/Outer Ring) | 55%/52.5% | 52%/52.5% |
| Internal Clearance | 0.0008~0.0014 | 0.0013~0.0019 |
| Contact Angle (Bo) | 13 Degrees | 20.5 Degrees |
| Jones L 10 Life | 24.9 Hours | 234 Hours |
| Stress (I.R.) | 265,000 PSI | 200,000 PSI |
| Lambda | 0.599 | 0.648 |

TABLE 2

39,500 RPM

| Parameter | Prior Art Bearing 201 | Improved Bearing 130 |
| --- | --- | --- |
| Race curvatures (Inner Ring/Outer Ring) | 55%/52.5% | 52%/52.5% |
| Internal Clearance | 0.0008~0.0014 | 0.0013~0.0019 |
| Contact Angle (Bo) | 13 Degrees | 20.5 Degrees |
| Jones L 10 Life | 12.3 Hours | 90.6 Hours |
| Stress (I.R.) | 284,500 PSI | 214,000 PSI |
| Lambda | 0.599 | 0.648 |

With respect to the above Tables, it may be appreciated that the air turbine starter bearing 130 not only possesses improved characteristics to prevent internal debris build up and/or marring or damage of the bearing surfaces, but also may provide longer operational life with improved performance. Thus the cost of maintaining the air turbine starter and any related aircraft down time may be advantageously reduced.

Because lubrication within the bearing can aid in bearing performance, in at least one embodiment, the cage 308 may have a lubrication attractive coating 404. More specifically, and with respect to oil lubrication, cage 308 may have a coating 404 that is oil attractive and which tends not to hold or attract debris. In at least one embodiment of the present invention, the oil attractive coating 404 that tends not to attract or hold debris is Manganese Phosphate. Under appropriate circumstances, the thickness of the coating may vary, however it is to be appreciated that the coating should not substantially alter the dimensions of cage 308 or impede the internal clearances.

The outer ring 302, plurality of balls 306, and inner ring 304 may be made of an alloy steel. Under appropriate circumstances the alloy may be an M-50 Alloy with a Rockwell hardness value of Rc 62.

With respect to FIG. 5, it can be appreciated that the race surface 316 of outer ring 302 provides a concave raceway 506 for balls 306 to move on the inner surface of outer ring 302. In contrast, the balls 306 also travel in a raceway around the outside surface of inner ring 304. Thus, the relative area of load-bearing contact between the raceways and the ball 306 is greater on outer ring 302 and smaller on inner ring 304. The result is higher contact stresses upon the inner ring 304. The susceptibility to debris embedment and/or damage within the race surface 322 of the inner ring 304 may in part be due to the relative increase in loading. In addition, because there is less surface area provided in the raceway of the inner ring 304 then provided in the raceway of the outer ring 302, the inner ring 304 is less able to tolerate loss of surface area to embedded debris or debris erosion. In at least one embodiment, the inner ring 304 may be made of a hardened alloy, such as VimCru-20 with a minimum Rockwell hardness value of Rc 67. Under appropriate circumstances ball 306 and outer ring 302 may also be manufactured from a hardened alloy, such as VimCru-20 with a minimum Rockwell hardness value of Rc 67. Under appropriate circumstances the ball 306 may be manufactured from a ceramic material such as silicon nitride. Other materials may be used depending on the particular desired application.

Rotation of the outer ring 302 of the angular contact thrust bearing 130 within air turbine starter 100 is generally undesirable as it may provide friction between additional components inducing additional undesirable wear and debris. As shown in FIG. 4, in at least one embodiment, the outer ring 302 may provide a locking device, such as notch 402. When placed over the drive shaft 121 within second housing 111, the notch 402 serves to mate with a protrusion or key from the internal wall of second housing 111, and prevent rotation of outer ring 302.

While the invention has been described with reference to the preferred embodiment, it will be understood by those skilled in the art that various alterations, changes and improvements may be made and equivalents may be substituted for the elements thereof and steps thereof without departing from the scope of the present invention. In addition, many modifications may be made to adapt to a particular situation or material to the teachings of the invention without departing from the essential scope thereof. Such alterations, changes, modifications, and improvements, though not expressly described above, are nevertheless intended and implied to be within the scope and spirit of the invention. Therefore, it is intended that the invention not be limited to the particular embodiments disclosed as the best mode contemplated for carrying out this invention, but that the invention will include all embodiments falling within the scope of the appended claims.

I claim:

1. An air turbine starter comprising:
    a first housing defining an air inlet, an air outlet and a flow path therebetween;
    a second housing coupled to the first housing to enclose a gearbox and an output shaft coupled to the gearbox;

a turbine wheel having circumferentially mounted blades disposed in the flow path of the first housing;

a rotatable turbine drive shaft coupled to the turbine wheel and extending into the second housing to drive the gearbox, the turbine shaft being supported by at least one bearing characterized by:

a plurality of balls, each ball having a uniform diameter ("D") and a longitudinal centerline;

a radially inner ring having a first shoulder, a second shoulder and a race surface therebetween to receive the balls, the first and second shoulders each having a radial height, the first shoulder radial height being less than the second shoulder radial height;

a radially outer ring having a first shoulder, a second shoulder and a race surface therebetween, the first and second shoulders each having a radial height, the first shoulder radial height being greater than the second shoulder radial height, and wherein the outer ring is located concentrically about the inner ring, with the balls therebetween, in a plane generally perpendicular to a predetermined axis of rotation, the longitudinal centerline of each ball parallel to the axis of rotation;

an annular cage located between the inner and outer rings and having openings to receive and separate the balls nested between the inner ring race surface and the outer ring race surface; and an oil circulation system to flow oil in a direction flowing from the first shoulder of the outer ring toward the second shoulder of the outer ring.

2. The air turbine starter of claim 1, wherein each cage opening is defined by an interior surface extending through the cage;

wherein the diameter of the interior surface is sized to receive an associated one of the balls;

wherein each interior surface has a radially outer circumferential edge and a radially inner circumferential edge; and wherein the inner and outer circumferential edges of each opening are located on either side of the longitudinal centerline of the associated ball.

3. The air turbine starter of claim 1, wherein the cage further includes a pilot aligning the cage to the first shoulder of the outer ring.

4. The air turbine starter of claim 1, wherein the first shoulder of the outer ring is a thrust bearing shoulder and the first shoulder of the inner ring is a thrust bearing shoulder.

5. The air turbine starter of claim 1, wherein the outer ring second shoulder is a lesser percentage of the ball diameter in height than the outer ring first shoulder.

6. The air turbine starter of claim 1, wherein the race curvature of the race surface of the inner ring is substantially about 51.5% to 53% of the ball diameter.

7. The air turbine starter of claim 6, wherein the race curvature of the race surface of the outer ring is substantially about 52% to 54% of the ball diameter.

8. The air turbine starter of claim 1, wherein the first shoulder of the outer ring is substantially between about 15% to 28% of the ball diameter.

9. The air turbine starter of claim 8, wherein the second shoulder of the outer ring is substantially between about 6% and 0% of the ball diameter.

10. The air turbine starter of claim 1, wherein the balls comprises eleven balls, each ball having a diameter of substantially $9/32$ inch.

11. The air turbine starter of claim 1, wherein the cage further comprises a lubrication attractive coating that tends not to hold or attract debris.

12. The air turbine starter of claim 11, wherein the lubrication attractive material is Manganese Phosphate.

13. The air turbine starter of claim 1, wherein the balls and outer ring are manufactured from M-50 (Rc 62) alloy.

14. The air turbine starter of claim 1, wherein the inner ring is manufactured from VimCru-20 (Rc 67) alloy.

15. The air turbine starter of claim 1, wherein:

the outer ring has an outer ring race surface diameter ("O");

the inner ring has an inner ring race surface diameter ("I");

an internal clearance is determined by the following equation:

$$O-I-2D; and$$

the internal clearance is between about 0.0013 and 0.0019 inch.

16. The air turbine starter of claim 3, wherein the clearance between the pilot and the first shoulder of the outer ring is between about 0.008 to 0.015 inch.

17. An air turbine starter bearing to permit two air turbine starter components to rotate relative to each other, the bearing comprising:

a plurality of rollers, each having uniform diameter and a longitudinal centerline;

a radially inner ring having a first shoulder, a second shoulder and a race surface therebetween to receive the rollers;

a radially outer ring having a first shoulder, a second shoulder and a race surface therebetween, the first and second shoulders each having a radial height, the first shoulder radial height being greater than the second shoulder radial height, and wherein the outer ring is located concentrically about the inner ring, with the rollers therebetween, in a plane generally perpendicular to a predetermined axis of rotation, the longitudinal centerline of each roller parallel to the axis of rotation; and an annular separator located between the inner and outer rings and having openings to receive and separate the rollers nested between the inner ring race surface and the outer ring race surface, the separator having a pilot to align the separator to the first shoulder of the outer ring.

18. The angular contact bearing of claim 17, wherein the first shoulder of the outer ring is a thrust bearing shoulder and the first shoulder of the inner ring is a thrust bearing shoulder.

19. The angular contact bearing of claim 17, wherein the rollers are balls.

20. The angular contact bearing of claim 17, wherein the outer ring second shoulder is a lesser percentage of the ball diameter in height than the outer ring first shoulder.

21. The angular contact bearing of claim 17, wherein the annular separator further comprises a lubrication attractive coating that tends not to hold or attract debris.

22. The angular contact bearing of claim 21, wherein the lubrication attractive coating is Manganese Phosphate.

23. The angular contact bearing of claim 17, wherein each separator opening is defined by an interior surface extending through the separator;

wherein the diameter of the interior surface is sized to receive an associated one of the rollers;

wherein each interior surface has a radially outer circumferential edge and a radially inner circumferential edge; and wherein the inner and outer circumferential edges of each opening are located on either side of the longitudinal centerline of the associated roller.

24. An air turbine starter bearing to permit two air turbine starter components to rotate relative to each other, the bearing comprising:

a plurality of balls, each ball having a uniform diameter and a longitudinal centerline;

a radially inner ring having a first shoulder, a second shoulder and a race surface therebetween to receive the balls;

a radially outer ring having a first shoulder, a second shoulder and a race surface therebetween, the first and second shoulders each having a radial height, the first shoulder radial height being greater than the second shoulder radial height, and wherein the outer ring is located concentrically about the inner ring, with the balls therebetween, in a plane generally perpendicular to a predetermined axis of rotation, the longitudinal centerline of each bail parallel to the axis of rotation; and an annular cage located between the inner and outer rings and having openings to receive and separate the balls nested between the inner ring race surface and the outer ring race surface, the cage having a pilot aligning the cage to the first shoulder of the outer ring.

25. The angular contact bearing of claim 24, wherein the first shoulder of the outer ring is a thrust bearing shoulder and the first shoulder of the inner ring is a thrust bearing shoulder.

26. The angular contact bearing of claim 24, wherein each cage opening is defined by an interior surface extending through the cage;

wherein the diameter of the interior surface is sized to receive an associated one of the balls;

wherein each interior surface has a radially outer circumferential edge and a radially inner circumferential edge; and wherein the inner and outer circumferential edges of each opening are located on either side of the longitudinal centerline of the associated ball.

27. The angular contact bearing of claim 24, wherein the race curvature of the race surface of the inner ring is substantially about 51.5% to 53% of the ball diameter.

28. The angular contact bearing of claim 27, wherein the race curvature of the race surface of the outer ring is substantially about 52% to 54% of the ball diameter.

29. The angular contact bearing of claim 24, wherein the first shoulder of the outer ring is substantially between about 15% to 28% of the ball diameter.

30. The angular contact bearing of claim 29, wherein the second shoulder of the outer ring is substantially between about 6% and 0% of the ball diameter.

31. The angular contact bearing of claim 24, wherein the balls comprises eleven balls, each ball having a diameter of substantially 9/32 inch.

32. The angular contact bearing of claim 24, wherein the cage further comprises a lubrication attractive coating that tends not to hold or attract debris.

33. The angular contact bearing of claim 32, wherein the lubrication attractive coating is Manganese Phosphate.

34. The angular contact bearing of claim 24, wherein the balls and outer ring are manufactured from M-50 (Rc 62) alloy.

35. The angular contact bearing of claim 24, wherein the inner ring is manufactured from VimCru-20 (Rc 67) alloy.

36. The angular contact bearing of claim 24, wherein:

the outer ring has an outer ring race surface diameter ("O");

the inner ring has an inner ring race surface diameter ("I");

an internal clearance is determined by the following equation:

O-I-2D; and the internal clearance is between about 0.0013 and 0.0019 inch.

37. The angular contact bearing of claim 24, wherein the clearance between the pilot and the first shoulder of the outer ring is between about 0.008 to 0.015 inch.

38. An air turbine starter bearing to permit two air turbine starter components to rotate relative to each other, the bearing comprising:

a radially inner ring having a first shoulder, a second shoulder and a race surface therebetween, the inner ring sized to receive one of the air turbine starter components;

a radially outer ring having a first shoulder, a second shoulder and a race surface therebetween, the first and second shoulders each having a radial height, the first shoulder radial height being greater than the second shoulder radial height, the outer ring located concentrically about the inner ring, in a plane generally perpendicular to a predetermined axis of rotation;

a plurality of balls located between the inner and outer rings and proximate to the race surface of each ring, each ball having a uniform diameter and generally located on a longitudinal centerline parallel to the axis of rotation;

an annular cage located between the inner and outer rings and characterized by:

a pilot to align the cage with the first shoulder of the outer ring;

openings to receive and separate the balls nested between the inner ring race surface and the outer ring race surface, wherein each cage opening is defined by an interior surface extending through the cage; wherein the diameter of the interior surface is sized to receive an associated one of the balls; wherein each interior surface has a radially outer circumferential edge and a radially inner circumferential edge; and wherein the inner and outer circumferential edges of each opening are located on either side of the longitudinal centerline of the associated ball.

39. The angular contact bearing of claim 38, wherein the first shoulder of the outer ring is a thrust bearing shoulder and the first shoulder of the inner ring is a trust bearing shoulder.

* * * * *

UNITED STATES PATENT AND TRADEMARK OFFICE
CERTIFICATE OF CORRECTION

| | | |
|---|---|---|
| PATENT NO. | : 6,969,235 B2 | Page 1 of 1 |
| APPLICATION NO. | : 10/440673 | |
| DATED | : November 29, 2005 | |
| INVENTOR(S) | : Robert H. Feest | |

It is certified that error appears in the above-identified patent and that said Letters Patent is hereby corrected as shown below:

Column 10, line 11, delete "("T")" and add --("I")--.
Column 11, line 21, delete "bail" and add --ball--.

Signed and Sealed this

Sixteenth Day of October, 2007

JON W. DUDAS
*Director of the United States Patent and Trademark Office*